Patented Jan. 15, 1952

2,582,824

UNITED STATES PATENT OFFICE 2,582,824

BITUMINOUS COMPOSITION

Frederick M. Fowkes, Oakland, Calif., assignor to Shell Development Company, San Francisco, Calif., a corporation of Delaware No Drawing. Application March 23, 1948, Serial No. 16,632

6 Claims. (Cl. 106—281)

This invention relates to bituminous compositions of improved adherence to aggregate.

The adhesion characteristics of asphalt have been improved to a limited extent by the incorporation therein of numerous types of modifying agents. Three principal classes of materials have been employed, namely, amines, acids and soaps. The usual method of utilizing these additives has been to incorporate them in the asphalt prior to coating of the aggregate. A second method for improving the aggregate-to-asphalt bond has been to prime the surface of the aggregate with an agent which will react with certain chemical components on the surface. The reaction product, in turn, was heated to form an anti-stripping agent with certain asphalt components. This latter method usually comprised wetting an acidic aggregate, such as granite, with an inorganic alkaline substance, such as lime. The primed aggregate was heated to react to form a calcium silicate, which, in turn, formed a salt such as calcium silicate oleate when the aggregate was subsequently coated with an asphalt containing oleic acid. This process was seriously limited by the fact that it could only be employed to improve compositions containing acidic aggregate and that heating as described was not economical. The method had no utility when applied to neutral or basic aggregates.

It is an object of the present invention to provide bituminous compositions exhibiting improved resistance toward the deteriorating influences of water and having improved mechanical stability.

Now, in accordance with the present invention, it has been found that the resistance of a bituminous composition to destruction by the action of water may be substantially improved by the following series of steps: The aggregate or other solid to be coated with asphalt is primed by treatment with an aqueous solution of an organic nitrogenous basic material. Subsequent to the priming action, the aggregate surface is coated with an asphalt containing an oleophilic organic acid. An organic ammonium salt is formed in situ at the interface between the aggregate surface and the asphalt.

Still in accordance with this invention, it has been discovered that the formation of the ammonium salt in this manner results in the creation of a rigid interfacial film which substantially improves the anti-stripping action of the composition.

The exact nature of the rigid film so produced has not been definitely determined. At the present time, however, the rigidity appears to be due to a network of interlocking crystals of the organic ammonium salt, the interstices of which are filled with asphalt. The resulting structure, which is probably no more than several molecules thick, appears to be highly inflexible and has been shown to substantially prevent the stripping of asphalt from an aggregate, regardless of the chemical nature of the aggregate surface.

The priming solution to be used, in accordance with the present invention, is principally composed of water or at least is largely aqueous in character. The solution may contain solubilizing or dispersing agents which are present for the purpose of dispersing the priming agent therein. The priming agents consists of organic nitrogenous bases which are water-soluble. The term "organic nitrogenous bases" is meant to include organic substances having at least one basic nitrogen group, regardless of other functional groups which may be present. Basic nitrogen groups are regarded as those which are capable of forming ammonium salts or their substantial equivalents. The most effective agents are water-soluble amines, including polyamines; the polyalkylene polyamines such as triethylene tetramine have been found to be especially effective. A special type of highly desirable priming agent is the polyamino condensation product of unsaturated aldehydes with either ammonia or amines. A desirable variety of this type is the condensation product of acrolein and ammonia, as more particularly described hereinafter. Heterocyclic bases such as pyridine and its water-soluble analogues may be used as well. Water-soluble proteins have been found to function satisfactorily. Examples of the latter are egg albumin, casein, pectin and gelatin. The term "water soluble" is meant to include substances which obviously dissolve in water as well as those materials, such as the above proteins, which are readily dispersible in water. It is understood that the proteins, due in part to their high molecular weight, probably do not form true aqueous solutions; however, for the present purpose, their aqueous dispersions may be regarded as substantially true solutions. When the aqueous solution is approximately 0.01–0.1 molar, effective priming has been found to result for the application of 1–5% of the solution to the aggregate surface. Solutions which are more concentrated may be employed in amounts thereof greater than 5% by weight based on the aggregate, but the excessive amounts have been found to be unnecessary.

The oleophilic organic acids which form ammonium salts with the above-described nitrogenous bases are those which are substantially soluble or at least readily dispersable in asphalt. These include especially the higher fatty acids and particularly those having at least 12 carbon atoms in the alkyl group directly attached to the carboxyl group. Preferred species of this variety include stearic, polymeric oleic, linoleic and linolenic acids as well as mixture thereof. Suitable mixtures may be obtained by the hydrolysis of naturally-occurring fats and oils, such as linseed oil, soy-bean oil, etc. Other acids suitable for the present purpose include naphthenic acids, especially those having a molecular weight above about 220. Mixtures containing suitable acids of this variety may be obtained by extraction from petroleum oils and especially from the fractions which are used for lubricating oil or from heavier oils. Acidification of spent caustic solutions which have been used in the treating of such fractions results in the separation of suitable naphthenic fractions. Resin acids such as rosin may be used in a similar manner. The acids are conveniently dissolved in the asphalt during an operation and should be present in an amount between 0.2 and 2.0% by weight of the asphalt.

The bituminous substances which may be improved by the process of the present invention include especially pyrogenous asphalt and air-blown asphalt, as well as the naturally-occurring asphalts and asphaltites, such as Gilsonite. Solids which may be primed, in accordance with the present invention, include wood, cement, glass, metal and the mineral aggregates ordinarily employed for road-building purposes and the like. The aggregates may be either alkaline (limestone), neutral or acidic (granite or rhyolite).

A preferred type of amine for use in the present invention comprises the water-soluble polyamines obtained by hydrogenating the condensation product of an alpha-beta unsaturated aldehydes and ammonia or an amine. Aldehydes which may be used for the purpose include especially acrolein and its homologs, such as methacrolein, alpha-ethylacrolein, alpha-propylacrolein, alpha-isopropylacrolein, the alpha-butylacroleins, and their homologs.

Aldehydes of this type may be condensed with ammonia or a primary amine, such as methylamine, at temperatures from about −70° C. to about +150° C. Liquid ammonia is a particularly favored reactant. The product obtained may be hydrogenated in order to improve its color or stability.

The polyamines so obtained are usually viscous oils containing up to about 10% oxygen and having an average molecular weight of 135–330. The ratio of the molecular weight to the equivalent weight generally is within the range from about 2.5 to about 4.

A typical preparation is carried out as follows:

22 parts of acrolein were mixed with 90 parts of anhydrous liquid ammonia at a temperature of −60° to −70° C. A clear mobile liquid was formed. The excess ammonia was removed from the mixture by allowing the mixture to warm to room temperature in an open vessel. The residue, amounting to 28 parts, was dispersed in 105 parts of absolute ethanol. 5 parts of Raney nickel catalyst were added to the dispersion and the mixture was subjected for one hour to the action of hydrogen gas under a pressure of 1000 pounds per square inch at 100° C. Low boiling material, chiefly ethanol, was removed by distillation under reduced pressure, leaving 18 parts of a viscous, water-soluble oil having the following characteristics:

Molecular weight _____ 228.00
Equivalent weight _____ 70.00
Per cent carbon _____ 61.38
Per cent nitrogen _____ 19.25
Per cent hydrogen _____ 10.80
Per cent oxygen _____ 8.57

The formation of a rigid film, in accordance with the present invention, may be demonstrated in the following manner: A drop of asphalt is inserted into an aqueous solution containing triethylene tetramine. If the asphalt contains no fatty acids, there is no evidence of rigid-film formation. This is indicated when a stirring rod is touched to the side of the asphalt drop in order to deform the surface thereof, since upon removal of the stirring rod, the drop rapidly assumes its original spherical shape. If the asphalt contains about 1% by weight of stearic acid, the deformation of the drop created by disturbance with the stirring rod will last for an appreciable period, varying from about 30 seconds to as much as several days.

The rigid films cannot be suitably created by adding a preformed organic ammonium salt to either the surface of the aggregate or to the asphalt. It appears to be necessary to form the salt in situ in order to build up a suitable matrix upon which the rigid film depends. This may be due to the substantial insolubility of the salt in either asphalt or water.

The following example illustrates the process of the present invention:

A medium-cure asphalt cut-back was used for the following tests: For use in samples card D, 1% by weight of stearic acid was dissolved therein while the asphalt was heated. Soda rhyolite aggregate was primed with 2% water. As indicated in the table below, the water was unmodified in samples A and C while it contained 1% by weight of triethylene tetramine in samples B and D. The primed aggregate was mixed with 6% by weight of asphalt. After curing for one hour, the coated aggregate was covered with distilled water at room temperature for twenty hours. At the end of this period, the per cent of the agregate still coated with asphalt was estimated in each case. The data obtained are given in the table below.

| Sample | Priming | Asphalt | Per Cent Coating Retained |
|---|---|---|---|
| A | No amine | No stearic acid | 5 |
| B | 1% amine | do | 15 |
| C | No amine | 1% stearic acid | 60 |
| D | 1% amine | do | 95 |

I claim as my invention:

1. A bituminous composition comprising a wet aggregate, an asphalt and at the interface therebetween a bonding agent which is a stearic acid salt of a hydrogenated polyamine condensation product of acrolein and ammonia, said salt being free from amido groups.

2. A bituminous composition comprising a wet aggregate, an asphalt and as an interfacial bonding agent at resulting interface therebetween a salt of a water-soluble lower polyalkylene polyamine and an asphalt-soluble fatty acid having at least 12 carbon atoms, said salt being free from amido groups.

3. A bituminous composition comprising a wet aggregate, an asphalt and as an interfacial bonding agent therebetween a salt of a water-soluble lower polyalkylene polyamine and oleic acid, said salt being free from amido groups.

4. A bituminous composition comprising a wet aggregate, an asphalt and as an interfacial bonding agent therebetween a salt of a water-soluble lower polyalkylene polyamine and stearic acid, said salt being free from amido groups.

5. A bituminous composition having improved resistance to deterioration by the action of water comprising an aggregate and an asphalt and at the interface therebetween a salt of triethylene tetramine and stearic acid, said salt being free from amido groups.

6. A bituminous composition comprising a wet aggregate, an asphalt and, at the interface therebetween, a bonding agent which is an amine salt of a water-soluble polyamine and a fatty acid of at least 12 carbon atoms, wherein the polyamine is selected from the group consisting of lower polyalkylene polyamines and a hydrogenated polyamine condensation product of acrolein and ammonia, said amine salt being free from amido groups.

FREDERICK M. FOWKES.

REFERENCES CITED

The following references are of record in the file of this patent:

UNITED STATES PATENTS

| Number | Name | Date |
|---|---|---|
| 1,674,523 | Sadtler | June 19, 1928 |
| 2,191,295 | Dohse et al. | Feb. 20, 1940 |
| 2,312,674 | Roediger | Mar. 2, 1943 |
| 2,317,959 | Johnson et al. | Apr. 27, 1943 |
| 2,370,386 | Anderson et al. | Feb. 27, 1945 |
| 2,378,235 | Miles | June 12, 1945 |
| 2,389,680 | Mikeska | Nov. 27, 1945 |
| 2,419,404 | Johnson | Apr. 22, 1947 |
| 2,426,220 | Johnson | Aug. 26, 1947 |
| 2,508,428 | Smith et al. | May 23, 1950 |

FOREIGN PATENTS

| Number | Country | Date |
|---|---|---|
| 513,944 | Great Britain | Oct. 26, 1939 |
| 560,716 | Great Britain | Apr. 18, 1944 |
| 568,385 | Great Britain | Apr. 3, 1945 |